(12) United States Patent
Harwood et al.

(10) Patent No.: US 11,972,289 B2
(45) Date of Patent: Apr. 30, 2024

(54) METHOD AND SYSTEM FOR PROVISIONING WORKFLOWS BASED ON LOCALITY

(71) Applicant: EMC IP Holding Company LLC, Hopkinton, MA (US)

(72) Inventors: John S. Harwood, Boston, MA (US); Robert Anthony Lincourt, Jr., Franklin, MA (US); William Jeffery White, Plano, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 523 days.

(21) Appl. No.: 17/236,754

(22) Filed: Apr. 21, 2021

(65) Prior Publication Data

US 2022/0342700 A1 Oct. 27, 2022

(51) Int. Cl.
*G06F 9/48* (2006.01)
*G06F 9/46* (2006.01)

(52) U.S. Cl.
CPC ............ *G06F 9/4881* (2013.01); *G06F 9/466* (2013.01)

(58) Field of Classification Search
CPC ................ G06F 9/4881; G06F 9/466
See application file for complete search history.

(56) References Cited

U.S. PATENT DOCUMENTS

| | | | |
|---|---|---|---|
| 7,720,864 B1 | 5/2010 | Muth et al. | |
| 9,356,883 B1 | 5/2016 | Borthakur | |
| 10,996,658 B1 | 5/2021 | Potts et al. | |
| 11,055,135 B2 | 7/2021 | Popovic et al. | |
| 11,176,534 B1 | 11/2021 | Pandey et al. | |
| 2003/0149685 A1 | 8/2003 | Trossman et al. | |
| 2005/0256818 A1* | 11/2005 | Sun ................ | G06Q 10/06316 705/301 |
| 2008/0072303 A1 | 3/2008 | Syed | |
| 2011/0138147 A1 | 6/2011 | Knowles et al. | |
| 2011/0145318 A1 | 6/2011 | Krishnamurthy et al. | |

(Continued)

OTHER PUBLICATIONS

1 Rosenthal et al., "Chaos Engineering", O'Reilly Media, Inc (Year: 2020).

*Primary Examiner* — Wissam Rashid
(74) *Attorney, Agent, or Firm* — Chamberlain, Hrdlicka, White, Williams & Aughtry; Aly Z. Dossa

(57) ABSTRACT

Techniques described herein relate to a method for deploying workflows. The method may include receiving, at a service controller of a federated controller, a request to deploy a workflow in a device ecosystem; decomposing, the workflow into a plurality of workflow portions; identifying an initial platform controller for a domain associated with an anchor point; making a determination that the domain associated with the initial platform controller is not able to perform remaining workflow portions of the plurality of workflow portions; in response to the determination: identifying a plurality of additional platform controllers for additional domains that previously expressed capabilities corresponding to the remaining workflow portions of the plurality of workflow portions; selecting, based on a locality associated with the anchor point, an additional platform controller of the plurality of additional platform controllers; and initiating performance of the workflow using the initial platform controller and the additional platform controller.

20 Claims, 5 Drawing Sheets

(56) References Cited

U.S. PATENT DOCUMENTS

| | | | |
|---|---|---|---|
| 2014/0075004 A1 | 3/2014 | Van Dusen et al. |
| 2014/0223427 A1 | 8/2014 | Bootland et al. |
| 2016/0075436 A1 | 3/2016 | Rossano et al. |
| 2016/0119289 A1 | 4/2016 | Jain et al. |
| 2016/0162478 A1 | 6/2016 | Blassin et al. |
| 2016/0300178 A1 | 10/2016 | Perry et al. |
| 2016/0357241 A1 | 12/2016 | Ramadoss et al. |
| 2016/0364271 A1 | 12/2016 | Burger et al. |
| 2017/0032048 A1 | 2/2017 | Qu |
| 2017/0048318 A1 | 2/2017 | Hebert et al. |
| 2017/0078392 A1 | 3/2017 | Gray et al. |
| 2017/0346683 A1 | 11/2017 | Li |
| 2018/0157651 A1 | 6/2018 | Smith et al. |
| 2018/0255329 A1 | 9/2018 | Gonzalez-banos et al. |
| 2018/0276044 A1 | 9/2018 | Fong et al. |
| 2019/0052549 A1 | 2/2019 | Duggal et al. |
| 2019/0197654 A1 | 6/2019 | Hoppert et al. |
| 2019/0250996 A1 | 8/2019 | Shiihara |
| 2019/0354331 A1 | 11/2019 | Neugarten et al. |
| 2019/0354402 A1 | 11/2019 | Bivens et al. |
| 2020/0127861 A1 | 4/2020 | Doshi et al. |
| 2020/0174838 A1 | 6/2020 | Li et al. |
| 2020/0241928 A1 | 7/2020 | Senevirathne et al. |
| 2020/0401491 A1 | 12/2020 | Mohamed et al. |
| 2021/0056509 A1 | 2/2021 | Lindy |
| 2021/0064405 A1 | 3/2021 | Ashkar et al. |
| 2021/0133622 A1 | 5/2021 | Nidd et al. |
| 2021/0192535 A1 | 6/2021 | Lee et al. |
| 2021/0314379 A1 | 10/2021 | Sodagar |
| 2021/0392056 A1 | 12/2021 | Duggal et al. |
| 2022/0012093 A1 | 1/2022 | Crabtree et al. |
| 2022/0058556 A1 | 2/2022 | Warake et al. |
| 2022/0067851 A1 | 3/2022 | Sinha et al. |
| 2022/0150307 A1 | 5/2022 | Walsh et al. |

\* cited by examiner

METHOD AND SYSTEM FOR PROVISIONING WORKFLOWS BASED ON LOCALITY

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy workflows, and how to efficiently do so once an execution environment is determined.

SUMMARY

In general, certain embodiments described herein relate to a method for deploying workflows. The method may receiving, at a service controller of a federated controller, a request to deploy a workflow in a device ecosystem; decomposing, the workflow into a plurality of workflow portions; identifying an initial platform controller for a domain associated with an anchor point; making a determination that the domain associated with the initial platform controller is not able to perform remaining workflow portions of the plurality of workflow portions; in response to the determination: identifying a plurality of additional platform controllers for additional domains that previously expressed capabilities corresponding to the remaining workflow portions of the plurality of workflow portions; selecting, based on a locality associated with the anchor point, an additional platform controller of the plurality of additional platform controllers; and initiating performance of the workflow using the initial platform controller and the additional platform controller.

In general, certain embodiments described herein relate to a non-transitory computer readable medium that includes computer readable program code, which when executed by a computer processor enables the computer processor to perform a method for deploying workflows. The method may receiving, at a service controller of a federated controller, a request to deploy a workflow in a device ecosystem; decomposing, the workflow into a plurality of workflow portions; identifying an initial platform controller for a domain associated with an anchor point; making a determination that the domain associated with the initial platform controller is not able to perform remaining workflow portions of the plurality of workflow portions; in response to the determination: identifying a plurality of additional platform controllers for additional domains that previously expressed capabilities corresponding to the remaining workflow portions of the plurality of workflow portions; selecting, based on a locality associated with the anchor point, an additional platform controller of the plurality of additional platform controllers; and initiating performance of the workflow using the initial platform controller and the additional platform controller.

In general, certain embodiments described herein relate to a system for deploying workflows. The system may include a federated controller for a device ecosystem, the federated controller comprising a plurality of service controllers. The system may also include a service controller of the federated controller, comprising a processor and memory, and configured to receive, at a service controller of a federated controller, a request to deploy a workflow in a device ecosystem; decompose, the workflow into a plurality of workflow portions; identify an initial platform controller for a domain associated with an anchor point; make a determination that the domain associated with the initial platform controller is not able to perform remaining workflow portions of the plurality of workflow portions; in response to the determination: identify a plurality of additional platform controllers for additional domains that previously expressed capabilities corresponding to the remaining workflow portions of the plurality of workflow portions; select, based on a locality associated with the anchor point, an additional platform controller of the plurality of additional platform controllers; and initiate performance of the workflow using the initial platform controller and the additional platform controller.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
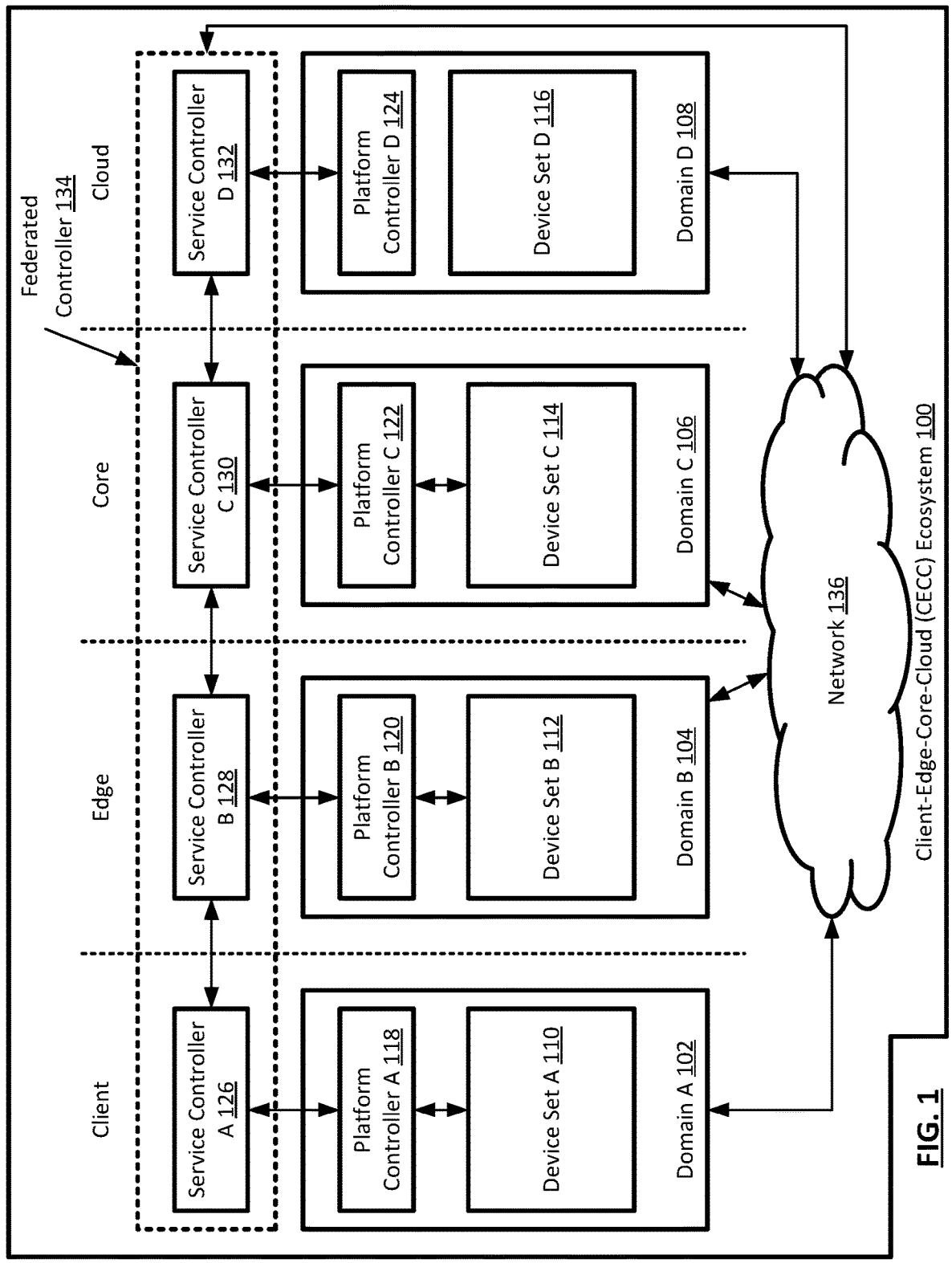
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, based on locality.

In one or more embodiments, as device ecosystems grow in size and complexity (e.g., from cloud to core to edge to client), connecting more diverse devices generating more data, the need to be able to inventory and characterize the connectivity is required in order to support complex workflows. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objectives (SLOs) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where a one or more portions of a given workflow should be deployed.

Such a graph or database may include ecosystem information in various levels of abstraction. For example, each portion of an ecosystem (e.g., client, far edge, near edge, core, cloud, etc.) may have one or more service controllers. In one or more embodiments, the services controllers operate collectively as a federated controller for the ecosystem. Additionally, in one or more embodiments, each domain within a given portion of an ecosystem may have a platform controller.

In one or more embodiments, the service controllers receive, from platform controllers in their ecosystem portion, capabilities and capacity information, and also receive the same from other service controllers in the federated controller for their respective one or more platform controllers. Such capability and capacity information shared among the service controllers of the federated controller, along with information related to connectivity between different portions of the ecosystem, may be one level of the graph/database of the ecosystem.

In one or more embodiments, each platform controller in an ecosystem obtains and stores more detailed information of the device set of the domain with which it is associated, including, but not limited to, details related to topology, connection bandwidth, processors, memory, storage, data stored in storage, network configuration, domain accelerators (e.g., graphics processing units (GPUs)), deployed operating systems, programs and applications, etc. In one or more embodiments, the more detailed information kept by the various platform controllers represents a different layer of the graph or database of the ecosystem. Thus, in one or more embodiments, the service controllers of the federated controller of an ecosystem have a map of the capabilities and capacity of the various portions of the ecosystem, while the underlying platform controllers have a more detailed map of the actual resources within a given domain device set with which they are associated.

In one or more embodiments, any service controller of the federated controller of an ecosystem may receive a request to execute a workflow (e.g., from a console accessing the service controller). In one or more embodiments, the workflow may be received as or transformed into a directed acyclic graph (DAG). For example, a workflow may be received as a YAML Ain't Another Markup Language (YAML) file that is a manifest representing a set of interconnected services. In one or more embodiments, the service controller decomposes the DAG into workflow portions, such as services required, data needed, etc. In one or more embodiments, one or more such workflow portions may be identified as an anchor point. In one or more embodiments, the service controller then queries the graph (e.g., by performing a depth first or breadth first search) or database (e.g., using database query techniques) representing the ecosystem to identify one or more initial platform controllers associated with one or more domains that are appropriate for the one or more anchor points (e.g., where the necessary data is or is generated from, where the infrastructure exists to execute a given service, etc.).

In one or more embodiments, once the anchor point has been identified, the service controller may then make a determination that the one or more domains associated with the one or more initial platform controller are unable to perform the entire workflow (i.e., all the portions of the workflow). Based on the determination, the service controller may identify additional platform controllers associated with additional domains that previously expressed capabilities to perform one or more remaining portions of the workflow. Such identification by the service controller may be performed using capabilities and capacity information associated with the additional platform controllers. In one or more embodiments, at least a portion of the identified additional platform controllers are selected by the service controller based on locality between the domains associated with the additional platform controllers and the one or more domains associated with the one or more anchor points to reduce the computational burden, monetary cost, and/or the time requirements for transmitting data between domains when executing a workflow.

In one or more embodiments, locality refers to the geographical distance and/or network distance of a domain relative to an anchor point. In one or more embodiments, the geographical distance is the physical distance (e.g., number of miles, kilometers, etc.) between a domain associated with an additional platform controller and a domain associated with an anchor point. In one or more embodiments, network distance is the number of network devices included in the network connections between domains that data must go through to get from the source to the target (i.e., the number of network hops required to transmit data between domains), the type of network connections between domains (e.g., a fiber connection, a copper connection, a wireless connection, etc.), the speed in which a network connection is able to transmit data, etc. Any other network information associated with how data is transmitted between domains may be used without departing from the scope of embodiments described herein.

In one or more embodiments of the invention, upon selecting the portion of the additional platform controllers based on locality, the service controller provides the workflow portions to the one or more initial platform controllers and the one or more additional platform controllers. In one or more embodiments of the invention, upon receiving the workflow portions, the one or more initial platform controllers and the one or more additional platform controllers execute the workflow portions to perform the workflow.

FIG. 1 shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include platform controller A (118) and device set A (110). Domain B (104) may include platform controller B (120) and device set B (112). Domain C (106) may include platform controller C (122) and device set C (114). Domain D (108) may include platform controller D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (124), service controller B (128), service controller C (130), and service controller D (132) may collectively be a federated controller (134). All or any portion of any device or set of devices in CECC ecosystem (100) may be operatively connected to any other device or set of devices via network (136). Each of these components is described below.

In one or more embodiments, CECC ecosystem (100) may be considered a hierarchy of ecosystem portions. In the example embodiment shown in FIG. 1, CECC ecosystem (100) includes a client portion, an edge portion, a core portion, and a cloud portion. However, CECC ecosystem (100) is not limited to the exemplary arrangement shown in FIG. 1. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or less layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of the CECC ecosystem (100) other than the example hierarchy shown in FIG. 1.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110).

In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, the network (136) may include any number of devices within any device set (e.g., 110, 112, 114, 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, service controllers and/or platform controllers (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

In one or more embodiments, domain A (102) also includes platform controller A (118). In one or more embodiments, platform controller A (112) is any computing device (described above), or any portion of any computing device. In one or more embodiments, platform controller A (118) executes as a service. In one or more embodiments, platform controller A (118) includes functionality to discover details of device set A (110). Such details include, but are not limited to: how devices are connected; physical location of devices; network distance between devices within domain A (102); and network distance between devices with domain A (102) and devices in other domains (e.g., 104, 106, 108); what resources a device has (e.g., processors, memory, storage, networking, accelerators, etc.); how much capacity of a device or set of devices are used; what operating systems are executing on devices; how many virtual machines or other virtual computing instances exist; what data exists and where it is located; and/or any other information about devices in device set A (110).

In one or more embodiments, based on the information discovered by platform controller A (118) about device set A (110), platform controller A determines what capabilities device set A (100), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, etc. Embodiments described herein are not limited to the aforementioned examples. In one or more embodiments, platform controller B (120), platform controller C (122), and platform controller D (124) are also computing devices (described above), and perform functionality similar to that of platform controller A (118) for their respective domains (i.e., domain B (104), domain C (106), and domain D (108)).

In one or more embodiments, each domain (e.g., 102, 104, 106, 108) in CECC ecosystem (100) includes a device set (e.g., 110, 112, 114, 116) and a platform controller (e.g., 118, 120, 122, 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that include servers with more compute ability than devices in the client portion. Similarly, the core portion of CECC ecosystem (100) may include more powerful devices (e.g., having more compute resources), a greater quantity of more powerful devices, specific architectures of sets of devices for performing certain tasks, etc. Also similarly, the cloud portion of CECC ecosystem (100) may include still more and different devices configured and deployed in different ways than the other portions of CECC ecosystem (100).

Additionally, although not shown in FIG. 1, the CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the platform controller for the domain (102, 104, 106, 108).

In one or more embodiments, each platform controller (118, 120, 122, 124) is operatively connected to a respective service controller (126, 128, 130, 132). Any portion of CECC ecosystem (100) may include any number of service controllers (126, 128, 130, 132), each of which may be operatively connected to any number of platform controllers (118, 120, 122, 124) in any number of domains (102, 104, 106, 108) in a given ecosystem portion (e.g., client, edge, cloud, core). In one or more embodiments, each service controller (126, 128, 130, 132) is also operatively connected to the other service controllers (126, 128, 130, 132) in CECC ecosystem (100). In one or more embodiments, the operatively connected service controllers (126, 128, 130, 132) of CECC ecosystem (100) form federated controller (134) for CECC ecosystem (100). In one or more embodiments, federated controller (134) functions as a distributed service for deploying workflows within CECC ecosystem (100). In one or more embodiments, any service controller of federated controller (134) may be accessed to request provisioning of a workflow. In one or more embodiments, each service controller (126, 128, 130, 132) receives, from operatively connected platform controllers within the same portion of CECC (100), information about what capabilities underlying device sets of a domain can perform, how much capacity is available on the device set within a given domain (which may be updated on any update schedule), geographical distances between devices, network distances between devices, and/or any other information or metadata that may be useful to determine whether a portion of a workflow should be or can be provisioned within a given domain. In one or more embodiments, each service controller of federated controller (134) also shares the information with each other service controller of federated controller (134). Collectively, the shared information may be organized as a graph, or database, or any other data construct capable of storing such information, and being queried to find such information. Such a graph or database may be a distributed data construct shared between the collection of service controllers of federated controller (134).

While FIG. 1 shows a configuration of components, other configurations may be used without departing from the scope of embodiments described herein. Accordingly, embodiments disclosed herein should not be limited to the configuration of components shown in FIG. 1.

Figure 2A:
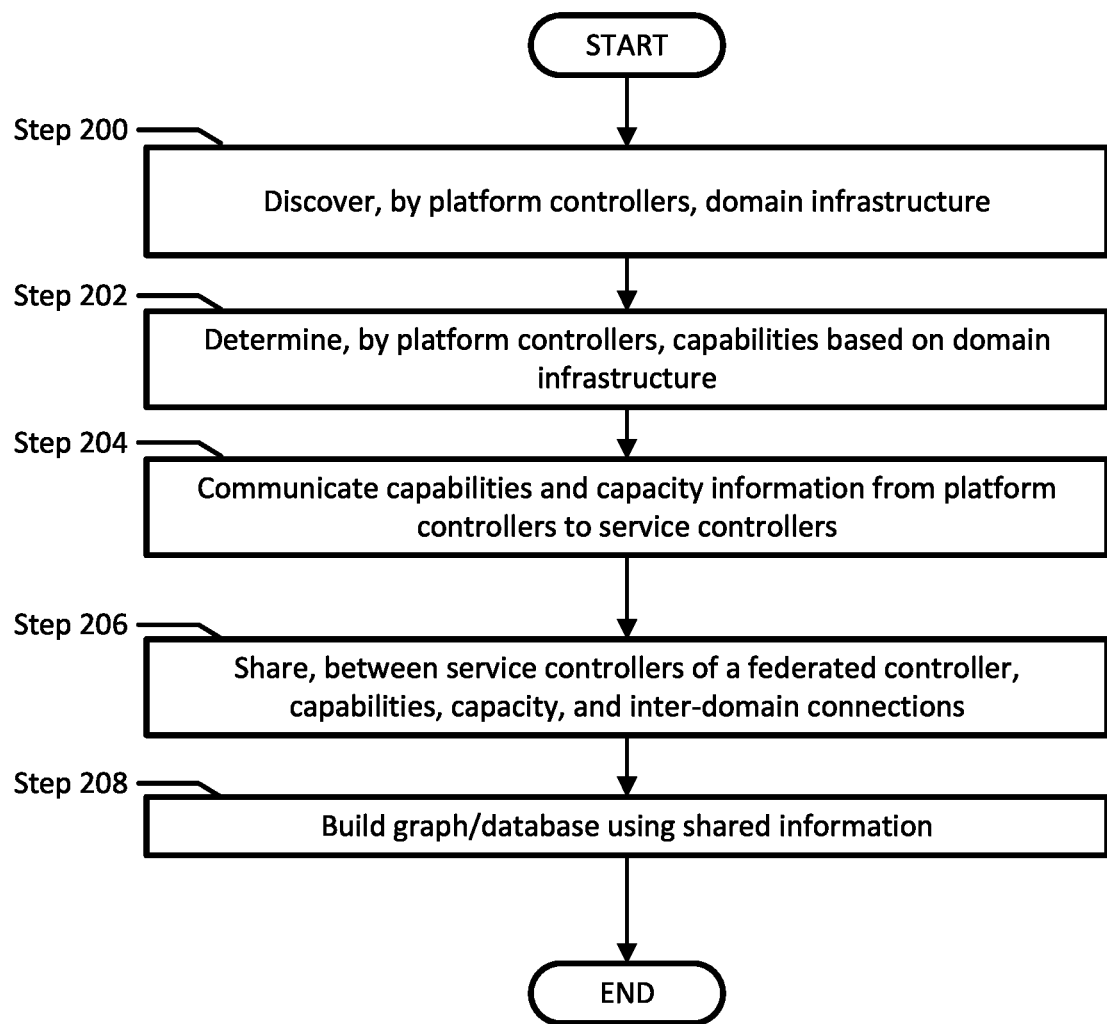
FIG. 2A shows a flowchart in accordance with one or more embodiments of the invention.

FIG. 2A shows a flowchart describing a method for discovering and obtaining information about an ecosystem of devices to be stored in a data construct for future queries when provisioning workflows in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, each platform controller in a given ecosystem discovers information about the device set in the domain in which the platform controller exists. Such information may include the topology of the devices, the computing resources of the devices, physical locations of the devices, network information associated with the devices, configuration details of the devices, operating systems executing on the devices, the existence of any number of virtualized computing device instances, the storage location of any number of datasets, how much of the capacity of any one or more devices is being used and/or has available, etc.

In one or more embodiments, any mechanism of scheme for discovering such information may be used, and any number of different mechanisms and/or schemes may be used to obtain various types of information. For example, the platform controller may request virtualization infrastructure information from one or more virtualization controllers, determine domain network topology by participating in and/or receiving information shared among domain network devices pursuant to one or more routing protocols, perform queries to determine quantity and type of processors, amount of memory, quantity of GPUs, amount of storage, number of network ports, etc. for servers, determine what type of information is being collected and/or processed by various sensors, controllers, etc., determine where datasets of a particular type or purpose are stored by communicating with one or more storage controllers, etc. Any other form of discovery may be performed by the platform controllers without departing from the scope of embodiments described herein.

In Step 202, based on the information discovered in Step 200, a given platform controller determines what capabilities the device set of a domain has. In one or more embodiments, determination of the capabilities of the device set, or any portion thereof, may be performed in any manner capable of producing one or more capabilities that a given device set, connected and configured in a particular way, may perform. For example, the platform controller may execute a machine learning algorithm that has been trained to identify certain capabilities of a domain set based on the set of information about a given device set of a domain.

In Step 204, the capabilities of the domain determined in Step 202 are communicated from the platform controller to an operatively connected service controller, along with information about the currently available capacity of the domain. For example, a platform controller may communicate to a service controller that the domain has the capability to perform inference, to analyze data in a particular way, to train certain types of machine learning algorithms, has the sensors to obtain certain types of data, etc. At the same time, the platform controller may also communicate, for example, that currently 27% of the resources of the domain, or any potion therein, are available to perform additional work. In one or more embodiments, the platform controller may also communicate any other information about the domain to the service controller, such as that the domain has (or has sensors to obtain) particular datasets that may be used for particular purpose (e.g., training a certain type of machine learning algorithm).

In Step 206, each of the service controllers of the federated controller of an ecosystem share the capabilities, capacity, and other information with each other. Sharing information may include sending some or all of the information to the other service controllers, and/or storing the information in a location that is commonly accessible by the service controllers. In one or more embodiments, the service controllers also share information about how the different portions of the ecosystem are operatively connected, including types of network devices, network topologies, network distances, and geographic distances between different portions of the ecosystem. For example, the service controllers may use information gained from devices executing a border gateway protocol (BGP) to obtain topology information for the ecosystem. As another example, the service controllers may use physical location information to determine geographic distances.

In Step 208, the federated controller of the ecosystem builds a graph or database using the information communicated from the platform controllers in Step 204, or otherwise obtained and shared in Step 208. In one or more embodiments, the graph or database is stored as a distributed data construct by the service controllers of the federated controller, and may be distributed in any way that a set of information may be divided, so long as it is collectively accessible by each of the service controller of the federated controller. In one or more embodiments, the graph or database is stored in a form which may be queried to find information therein when determine how to provision portions of a workflow for which execution is requested. Receiving a request to execute a workflow, querying the graph or database, and provisioning the workflow portions to various domains in the various portions of the ecosystem are discussed further in the description of FIG. 2B, below.

Figure 2B:
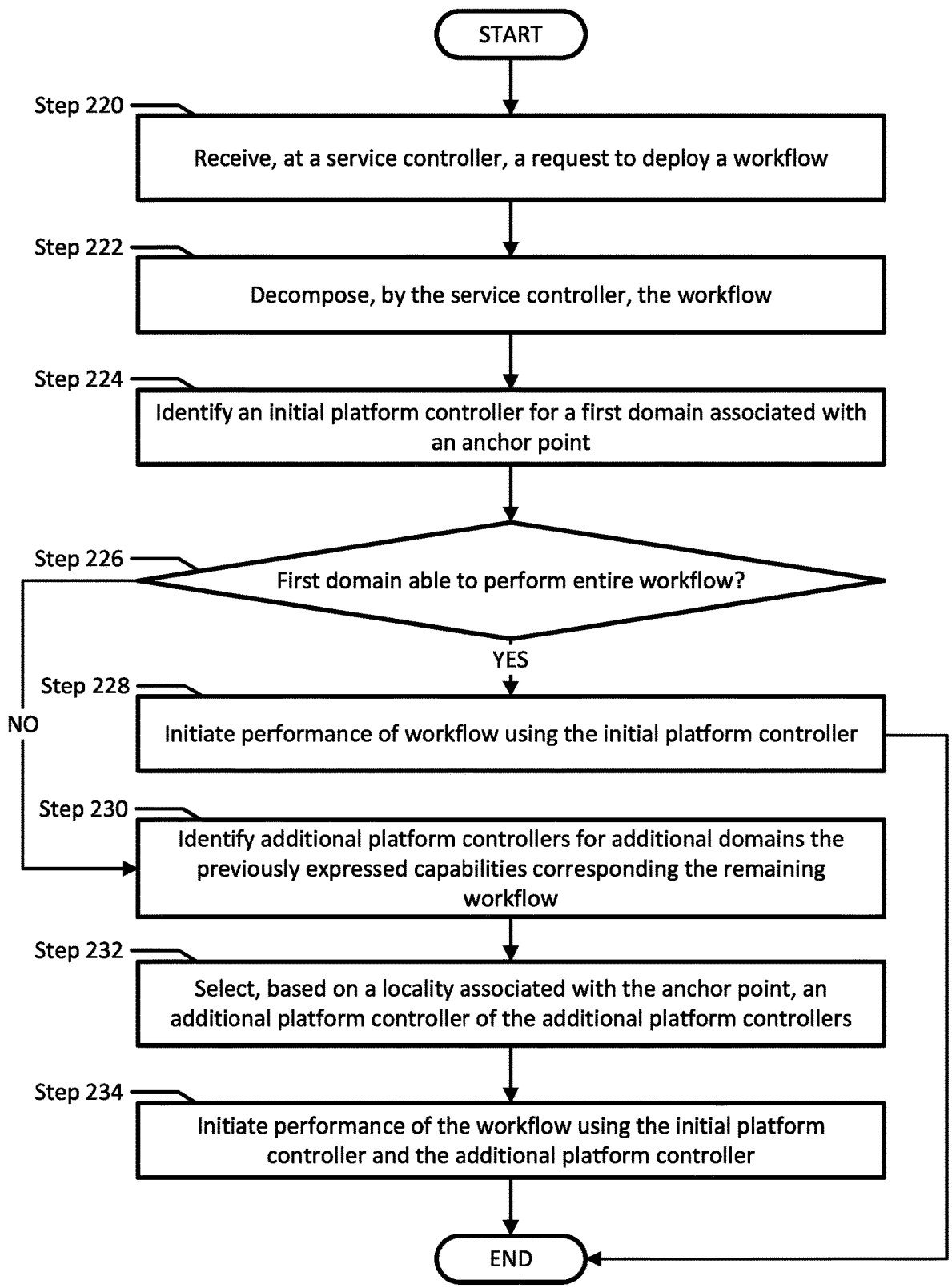
FIG. 2B shows a flowchart in accordance with one or more embodiments of the invention.

FIG. 2B shows a flowchart describing a method for provisioning workflows within a device ecosystem in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request to deploy a workflow is received at a service controller of a federated controller of a device ecosystem. In one or more embodiments, the request is received in any form that conveys, at least, requirements and constraints for performing the workflow. Constraints may be based, at least in part, on an SLO associated with the workflow between the entity requesting execution of the workflow and the entity providing the ecosystem in which the workflow will be deployed. Requirements may include that the workflow will require certain amounts and/or types, of compute resources of an ecosystem of devices, require certain data be available and/or obtained, require that certain technologies for data transfer be used (e.g., low latency network solutions), etc. In one or more embodiments, the request is received in a form that can be understood as or converted to a DAG. For example, the request may be received in the form of a YAML file that is a manifest of the interconnected services of a workflow. The request may be received at a service controller through any form of communicating with a computing device. For example, a user may be provided with access to a cloud console that is configured to access one or more service controllers of a CECC ecosystem.

In Step 222, the service controller decomposes the workflow. In one or more embodiments, decomposing the workflow includes identifying various workflow portions, such as services to be executed, data to be used and/or obtained, etc. In one or more embodiments, decomposing a workflow includes expressing the workflow as a DAG. A given workflow may include any number of workflow portions. As an example, a workflow may be a single service. As another example, a workflow may be any number of services that are in an ordered relationship with any number of interrelated dependencies between them. In one or more embodiments, decomposing a workflow includes identifying one or more anchor points of the workflow. In one or more embodiments, an anchor point is any workflow portion that can be identified as requiring a specific placement within the device ecosystem in which the workflow is to be deployed. As an example, an anchor point may be a particular dataset that is needed (e.g., for training a machine learning algorithm) that is stored in a certain storage location within the ecosystem. As another example, an anchor point may be a particular capability (e.g., inference, certain data analytics, etc.) that a workflow portion requires that may only be performed by domain device sets having particular characteristics. As another example, an anchor point may be the need for data acquired in a specific geographic region. Workflow portions other than the aforementioned examples may be identified without departing from the scope of embodiments described herein.

In Step 224, the service controller identifies a platform controller of a first domain that is associated with an anchor point. In one or more embodiments, the service controller identifies the platform controller and corresponding domain associated with the anchor point by performing a query to the set of information generated from the service controllers one or more underlying platform controllers and from the other service controllers of the federated controller, as is discussed above in the description of FIG. 2A. As an example, the capabilities, capacity, and operative connectivity of the various domains in the ecosystem may be organized as a graph, and the service controller may perform a breadth first or depth first search using the graph information structure. As another example, the capabilities, capacity, and operative connectivity of the various domains in the ecosystem may be organized as a database, and the service controller may perform a database query to find the information. As discussed above, there may be one or more anchor points without departing from embodiments of the invention. In scenarios where the decomposition of the workflow results in the identification of more than one anchor point, the service controller may identify one initial platform controller and corresponding domain that includes the one or more anchor points, or the service controller may identify more than one initial platform controllers and corresponding domains associated with the more than one anchor points using the methods described above. The service controller may identify any number of anchor points, and as a result, may identify any number of initial platform controllers without departing from the scope of embodiments described herein.

In Step 226, a determination is made as to whether the first domain is able to perform the entirety of the workflow. In one or more embodiments of the invention, the service controller uses the information obtained in Step 224 to determine whether the initial platform controller includes the one or more capabilities needed to perform the entirety of the workflow. As discussed above, the workflow may include one or more workflow portions corresponding to one or more services, data sets, etc. that are required to perform the workflow. The information may be used to identify capabilities and capacities associated with the domain associated with the initial platform controller. The capabilities and capacities may indicate whether the domain includes the necessary resources and resource capacity to perform the entire workflow. If the capabilities and capacity information indicates that the domain corresponding to the initial platform controller is able to perform the entire workflow, then the service controller may determine that the domain is able to perform the entire workflow. If the capabilities and capacity information indicates that the domain corresponding to the initial platform controller is not able to perform the entirety of the workflow, (i.e., the domain is only able to perform a portion of the workflow), then the service controller may determine that the domain is not able to perform the entirety of the workflow. In scenarios in which there are more than one initial platform controllers, the service controller may determine whether of not the initial platform controllers are able to perform the entirety of the workflow based on the capability and capacity information associated with each of the more than one initial platform controllers using the same methods described above without departing from the scope of embodiments described herein.

As an example, a workflow may include obtaining data from cameras on a car and using that data to generate a prediction using a machine learning algorithm Obtaining the data from the cameras may be the anchor point, and using the data to generate a prediction using the machine learning algorithm may be a second portion of the workflow. Capabilities and capacities information associated with the domain of the initial platform controller may indicate that the domain is able to and has the resources to obtain the data from cameras on a car, but not execute the machine learning algorithm to generate a prediction. In this example, based on the capabilities and capacities information associated with the domain of the initial platform controller, the service controller may determine that the domain corresponding to the initial platform control is not able to perform the entire workflow.

In one or more embodiments, if a determination is made that the first domain is able to perform the entirety of the workflow, then the method proceeds to Step 228. In one or more embodiments, if a determination is made that the first domain is not able to perform the entirety of the workflow, then the method proceeds to Step 230.

In Step 228, the service controller initiates the performance of the workflow using the initial platform controller. In one or more embodiments, the performance of the workflow is initiated by directly providing the workflow and constraints to the initial platform controller(s) that are in the same ecosystem portion as the service controller. In one or more embodiments, workflow portions and corresponding constraints are provided to the initial platform controller(s) indirectly (e.g., by way of another service controller that is in the ecosystem portion in which the platform controller(s) exist). In one or more embodiments, the workflow and any corresponding constraints are provided to the platform controllers using any appropriate method of data transmission. As an example, the service controller may communicate the workflow details and corresponding constraints as network data traffic units over a series of network devices that operatively connect the service controller and the initial platform controller(s). In one or more embodiments of the invention, after obtaining the workflow and constraints from the service controller, the one or more initial platform controller may provision and/or configure devices included in the one or more domains corresponding the one or more initial platform controllers to perform the workflow in a way that satisfies the constraints. In one or more embodiments, once all or any portion of the device set of the one or more domains has been configured to perform the workflow, the workflow is executed.

In Step 230, the service controller identifies additional platform controllers that previously expressed capabilities corresponding to the remaining workflow portions. In one or more embodiments, the service controller identifies the additional platform controllers and corresponding domains associated with the remaining portions of the workflow by performing a query to the set of information generated from the service controller's one or more underlying platform controllers and/or from the other service controllers of the federated controller, as is discussed above in the description of FIG. 2A. As an example, the capabilities, capacity, and operative connectivity of the various domains in the ecosystem may be organized as a graph, and the service controller may perform a breadth first or depth first search using the graph information structure. As another example, the capabilities, capacity, and operative connectivity of the various domains in the ecosystem may be organized as a database, and the service controller may perform a database query to find the information.

As discussed above, the initial platform controller(s) may not be able to the entirety of the workflow, resulting in remaining workflow portions that need to be provisioned for by the service controller. There may be any number of remaining workflow portions. The service controller may identify any platform controller as an additional platform controller that includes capability and capacity information that indicates that the domain corresponding to the platform controller is able to perform one or more remaining portions of the workflow. The service controller may identify any number of additional platform controllers that may be able to perform any number of the remaining portions of the workflow without departing from the scope of embodiments described herein.

In Step 232, the service controller selects, based on a locality corresponding to the anchor point identified in Step 224, an additional platform controller of the additional platform controllers identified in Step 230. In one or more embodiments of the invention, the set of information associated with each additional platform controller is generated or obtained from the service controller's one or more underlying platform controllers, and/or from the other service controllers of the federated controller, as is discussed above in the description of FIG. 2A, and includes a locality between the anchor point (or anchor points) and the additional platform controllers. In one or more embodiments of the invention, the locality specifies a geographical distance and/or a network distance between the anchor point and an additional platform controller. The service controller may select the additional platform controller with the best locality relative to the anchor point. For example, the service controller may select the additional platform controller that includes the shortest geographical distance and/or network distance relative to the anchor point to reduce the time and/or computational requirements needed to transmit data from domain to domain when performing the workflow. The service controller may select any number of platform controllers that perform any number of the remaining portions of the workflow without departing from the scope of embodiments described herein.

As an example, two additional platform controllers may be associated with two domains, a first additional platform controller associated with a first additional domain and a second additional platform controller associated with a second additional domain. Each of these additional domains may able to perform the remaining portion of the workflow. The first additional domain may be located 100 miles from the domain that includes the anchor point. The second domain may be located 250 miles from the domain that includes the anchor point. The first additional domain and the second additional domain may both be connected to the domain with the anchor through a network connection that includes two network devices and is able to transmit data with a speed of 500 Mbps (megabits per second). The service controller may select the first additional platform controller corresponding too the first domain based on its locality (i.e., closer relative geographical distance associated with the anchor point compared to the second domain).

In a further example, two additional platform controllers may be associated with two domains, a first additional platform controller associated with a first additional domain and a second additional platform controller associated with a second additional domain. Each additional domain may able to perform the remaining portion of the workflow. The first additional domain may be located 100 miles from the domain that includes the anchor point. The second domain may be located 250 miles from the domain that includes the anchor point. The first additional domain may be connected to the domain with the anchor through a network connection that includes four network devices and is able to transmit data with a speed of 500 Mbps (megabits per second). The second additional domain may be connected to the domain with the anchor point through a network domain that includes two network devices and is capable of transmitting data with a speed of 1000 Mbps. The service controller may select the second additional platform controller corresponding to the second domain based on its locality (i.e., closer relative network distance associated with the anchor point compared to the first domain), despite the fact that it is geographically farther from the anchor point.

In Step 234, the service controller initiates the performance, at least in part, of the workflow using the initial platform controller and the additional platform controller. In one or more embodiments, the performance of the workflow is initiated by directly providing the workflow and constraints to the one or more initial platform controllers and the one or more additional platform controllers that are in the same ecosystem portion as the service controller. In one or more embodiments, other workflow portions and corresponding constraints are provided to the one or more initial platform controllers and the one or more additional platform controllers indirectly (e.g., by way of the service controller in the ecosystem portion that the one or more initial platform controllers and the one or more additional platform controllers exists in). In one or more embodiments, the workflow and any corresponding constraints are provided to the one or more initial platform controllers and the one or more additional platform controllers using any appropriate method of data transmission. As an example, the service controller may communicate the workflow details and corresponding constraints as network data traffic units over a series of network devices that operatively connect the service controller and the one or more initial platform controllers and the one or more additional platform controllers. In one or more embodiments of the invention, after obtaining the workflow and constraints from the service controller, the one or more initial platform controllers and the one or more additional platform controllers may provision and/or configure devices included in the one or more domains corresponding the one or more initial platform controllers and the one or more additional platform controllers to perform the workflow portions in a way that satisfies the workflow constraints. In one or more embodiments, once all or any portion of the device set of the one or more domains has been configured to perform the workflow, the workflow is executed.

Figure 3:
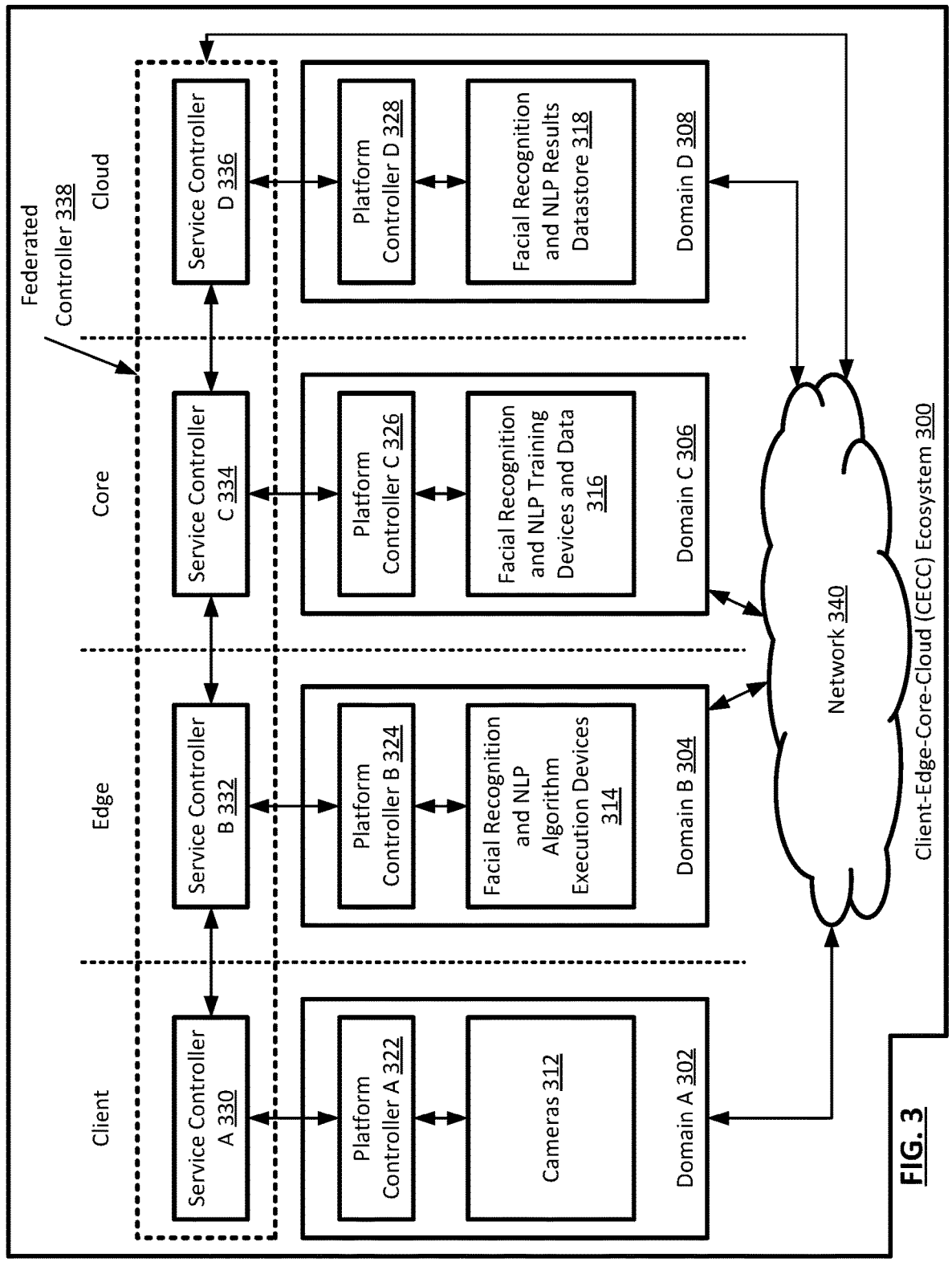
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein may use a device ecosystem organized and interconnected in any manner, and that any number of different workflows to achieve any number of different results may be deployed in such an ecosystem of devices.

Referring to FIG. 3, consider a scenario in which a hospital has cameras deployed in an ambulance to monitor events while the ambulance services emergencies in a surrounding area. The hospital wants to process video data obtained from the cameras in the ambulance to generate information associated with the events. To achieve this goal, the hospital needs a natural language processing algorithm that transcribes conversations between patients, witnesses, and medical workers, and a facial recognition algorithm that identifies faces of the patients, witnesses, and medical workers using the video data obtained by the cameras on the ambulance. The results may then be classified by a classifier for insurance and/or law enforcement investigation purposes.

In such a scenario, the store will utilize CECC ecosystem (300), which includes domain A (302) in a client portion of the ecosystem, domain B (304) in an edge portion of the ecosystem, domain C (306) in a core portion of the ecosystem, and domain D (308) in a cloud portion of the ecosystem. Domain A (302) includes platform controller A (320) and cameras (312). Domain B (304) includes platform controller B (324), and facial recognition and natural language processing (NLP) algorithm execution devices (314). Domain C (306) includes platform controller C (326) and facial recognition and NLP training devices and data (316). Domain D (308) includes platform controller D (328) and facial recognition and NLP results datastore (320). Domain A (302) is operatively connected to service controller A (330). Domain B (304) is operatively connected to service controller B (332). Domain C (306) is operatively connected to service controller C (334). Domain D (308) is operatively connected to service controller D (336). Service controller A (330), service controller B (332), service controller C (334), and service controller D (336) collectively are federated controller (338). All or any portion of any device or set of devices in CECC ecosystem (300) may be operatively connected to any other device or set of devices via network (340).

The client portion of the ecosystem exists as cameras (312) on the ambulance, and the associated computing devices for capturing the video data. The edge portion of the ecosystem exists at the hospital, and includes computing devices for executing the trained facial recognition algorithms and trained NLP algorithms (i.e., facial recognition algorithm and NLP algorithm execution devices (314)). The hospital is part of a national chain that has a number of data centers across the country that collectively make up the core portion of the store chain's device ecosystem. Domain C (306) is in a data center of the core portion that is located in the same region as the hospital. The cloud portion of the ecosystem is used for storing information relevant to the chain of hospitals, and for historical purposes, as well as being the location from which all events are reviewed for insurance and/or law enforcement investigation purposes.

When the hospital seeks to implement the video processing scheme, it submits the workflow as a YAML file to service controller B (332), which is implemented on a server located at the hospital and accessed via a console from a computer of the hospital manager. Service controller B (332) converts the YAML file into a DAG. In the DAG, the video data must be obtained from the cameras (312) on the ambulance, the facial recognition algorithm and NLP algorithm must be trained using video data the hospital owns. The trained facial recognition algorithm and NLP algorithm must be provided to the facial recognition and NLP algorithm execution devices (314) located in the edge portion of the ecosystem that is at the hospital. The video data from the cameras (312) must be provided to facial recognition and NLP algorithm execution devices (314). Finally, the results of executing the facial recognition and NLP algorithm based on the image data must be stored in the cloud so that the events may be investigated.

Service controller B (332) decomposes the DAG, and identifies the video acquisition from the cameras in the ambulance as the anchor point. Service controller B (332) then performs a search of a previously constructed graph of capabilities and capacity of the various domains in the ecosystem, and identifies domain A (302) as including the relevant cameras (312). Domain A (302) and the cameras (312) therein become the anchor point for the workflow, with platform controller A (322) identified as the initial platform controller. Service controller B (332) determines, based on the previously constructed graph of capabilities and capacity associated with domain A (302), that domain A (302) is only able to perform the anchor point and provide the video data to other domains and is not able to perform the entire workflow. Based on the determination, service controllers of the federated controller (338) continue the search based on the remaining workflow portions, by searching within portions of the ecosystem to identify additional platform controllers corresponding to domains that are able to perform the remaining portions of the workflow. Service controller B (332) identifies three additional platform controllers, including platform controller B (324), that have expressed capability to execute facial recognition algorithms and NLP algorithms.

Furthermore, service controller A (330) selects platform controller B (324) as the additional platform controller based on the locality of domain B (304) relative to the anchor point. Domain B (304) is a hospital located within the same geographical region (i.e., within 50 miles of the ambulance) as the ambulance, while the domains associated with the other two identified additional platform controllers include hospitals that are more than 500 miles away and all three domains share a similar network connection (i.e., similar network distance). Service controller B (332) further identifies two additional platform controllers, including platform controller C (326), that expressed, through service controller C (334), capability to train facial recognition algorithms and NLP algorithms and include the video data to train the facial recognition algorithm and the NLP algorithm. Service controller A (330) selects platform controller C (326) as the additional platform controller based on the locality of domain C (306) relative to the anchor point. Domain C (306) is a data center associated with the hospital chain located within the same geographical region as the ambulance and the hospital, while the other domain associated with the other identified additional platform controller includes a data center associated with the chain of hospitals that is more than 500 miles away, and both domains share a similar network connection (i.e., same network distance).

Still further, service controller B (332) further identifies two additional platform controllers, including platform controller D (328), that expressed, through service controller D (336), capability for storing facial recognition and NLP results. Service controller B (332) selects platform controller D (326) as the additional platform controller based on the locality of domain D (306) relative to the anchor point. Domain D (308) is a cloud computing data center associated with the hospital chain located about 500 miles away from the anchor point. Similarly, the other domain is a cloud computing data center associated with the hospital chain located about 500 miles away from the anchor point. However, domain D (308) is connected to the other domains (302, 304, 306) through a network connection that includes two network devices (i.e., requires two network hops to transmit data) that are capable of transmitting data at a speed of 2000 Mbps, while the other domain of the other additional platform controller is connected to the other domains (302, 304, 306) through a network connection that includes ten network devices (i.e., requires ten network hops to transmit data) that are capable of transmitting data at a speed of 1000 Mbps.

Based on the above results gained from searching within the graph structure maintained by the service controllers of federated controller (338), service controller B (332) provides the various workflow portions to the appropriate initial platform controller, platform controller A (322), and the additional platform controllers, platform controller B (324), platform controller C (326), and platform controller D (328), to perform the workflow portions.

Once assigned, platform controller A (322) deploys the data acquisition portion of the workflow on the cameras (312) of the ambulance. Platform controller B (324) provisions facial recognition and NLP devices execution devices (314) of domain B (304) to execute the facial recognition algorithm and the NLP algorithm to generate facial recognition and NLP results using video data obtained from the cameras (312) of domain A (302). Platform controller C (326) provisions the set of devices of domain C (306) to perform facial recognition algorithm and NLP algorithm training and connects the devices to the appropriate training data set within domain C (306) to use during the training. The devices and data are shown collectively in FIG. 3 as facial recognition and NLP training devices and data (316). Platform controller D (328) provisions storage within domain D (308) as the facial recognition and NLP results datastore (318) to store the results of the execution of the facial recognition algorithm and the NLP algorithm.

As the various workflow portions get deployed in the appropriate locations in the ecosystem, execution begins. First, the facial recognition algorithm and NLP algorithm are trained using the hospital chains existing labeled video data in facial recognition and NLP training devices and data (316) of domain C (306). Once the algorithms are sufficiently trained, the trained algorithms are provided over network (340) to facial recognition and NLP algorithm execution devices (314) of domain B (304). At that point, cameras (312) in domain A (302) begin capturing video of events as the ambulance services emergencies in the area surrounding the hospital. The video is transmitted to the facial recognition and NLP algorithm execution devices (314). Facial recognition and NLP algorithm execution devices (314) then execute the facial recognition algorithm and the NLP algorithm using the video to transcriptions of conversations and facial recognition information associated with events encountered by the ambulance. The results are then sent to the facial recognition and NLP results datastore (318) of domain D (308). An classification module (not shown) also in domain D (308) may access the results, and classify events based on the results for law enforcement and/or insurance investigation purposes.

In the above example, the graph construct representing the capabilities and capacity of the various domains was used to quickly and automatically determine an initial platform controller corresponding to a domain that includes an anchor point associated with a workflow based on the requirements, constraints, and capabilities learned by decomposing the DAG of the workflow. Once the anchor point was identified, additional platform controllers associated with additional domains were identified based on the graph construct representing the capabilities and capacity of the additional domains to perform remaining workflow portions. Platform controllers associated with domains of the additional platform controllers were selected based on localities relative to the anchor point to provision the remaining workflow portions to domains that include a short geographical distance and/or a short network distance. After selecting the additional platform controllers, the service controller provided the workflow portions to the initial platform controller and the additional platform controller, the platform controllers were able to initiate performance of the workflow, thereby avoiding provision a workflow using domains with great geographical distances and/or network distances between the domains resulting in increased time and computational requirements to perform the workflow that may result in a failure to meet SLO associated with the workflow.

Figure 4:
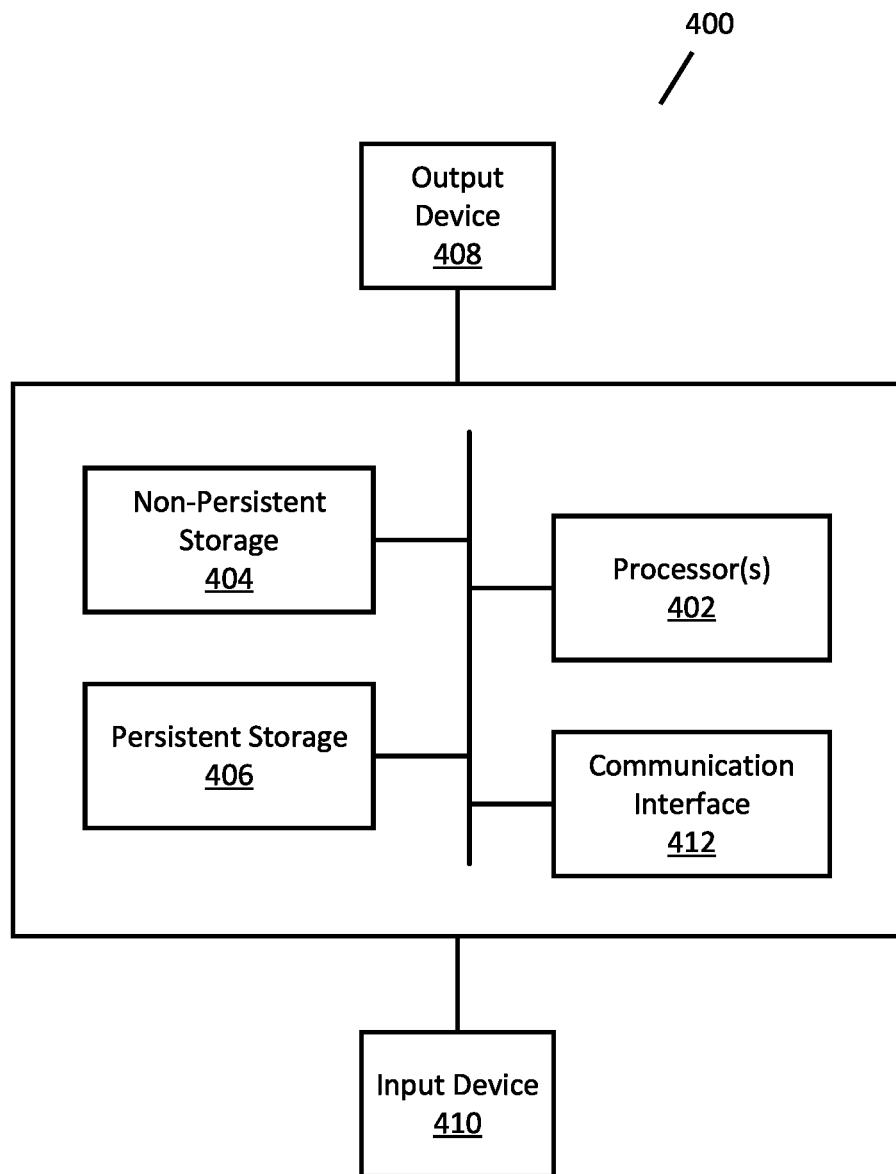
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

Embodiments described herein use several layers of a graph or database as a mechanism to manage the ecosystem at scale using algorithms and techniques for searching and querying. In one or more embodiments, building relationships and maintaining state of the resources and data for supporting service delivery allows for capturing, maintaining, and analyzing the mapping in the graph and/or relationships in the database to determine anchor points when provisioning workflows. In addition, in one or more embodiments, when domains associated with anchor points are unable to perform the entirety of workflows, provisioning workflows to additional domains based on locality to increase the likelihood of meeting the SLO for the workflows, and reducing the computational burden and of temporal requirements of executing the workflows in the ecosystem.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for deploying workflows, the method comprising:

receiving, at a service controller of a federated controller, a request to deploy a workflow in a device ecosystem;
decomposing, by the service controller, the workflow into a plurality of workflow portions;
identifying an initial platform controller for a domain associated with an anchor point, wherein the initial platform controller previously expressed capabilities corresponding to a first workflow portion of the plurality of workflow portions;
making a determination that the domain associated with the initial platform controller is not able to perform remaining workflow portions of the plurality of workflow portions, wherein the remaining workflow portions of the plurality of workflow portions does not comprise the first workflow portion;
in response to the determination:
identifying a plurality of additional platform controllers for additional domains that previously expressed capabilities corresponding to the remaining workflow portions of the plurality of workflow portions;
selecting, based on a locality associated with the anchor point, an additional platform controller of the plurality of additional platform controllers; and
initiating performance of the workflow using the initial platform controller and the additional platform controller.

2. The method of claim 1, wherein the locality specifies a relative association between the additional platform controller and the anchor point.

3. The method of claim 2, wherein the relative association comprises at least one selected from a group consisting of geographical distance and network distance.

4. The method of claim 3, wherein the selecting of the additional platform controller comprises making a determination that the additional platform controller has a shorter geographical distance relative to the anchor point than other additional platform controllers of the plurality of additional platform controllers.

5. The method of claim 3, wherein the selecting of the additional platform controller comprises making a determination that the additional platform controller has a shorter network distance relative to the anchor point than other additional platform controllers of the plurality of additional platform controllers.

6. The method of claim 1, wherein the anchor point is one selected from a group consisting of a data set and a required capability for a workflow portion of the plurality of workflow portions.

7. The method of claim 1, wherein the first workflow portion of the plurality of workflow portions comprises the anchor point.

8. A non-transitory computer readable medium comprising computer readable program code, which when executed by a computer processor enables the computer processor to perform a method for deploying workflows, the method comprising:
receiving, at a service controller of a federated controller, a request to deploy a workflow in a device ecosystem;
decomposing, by the service controller, the workflow into a plurality of workflow portions;
identifying an initial platform controller for a domain associated with an anchor point, wherein the initial platform controller previously expressed capabilities corresponding to a first workflow portion of the plurality of workflow portions;
making a determination that the domain associated with the initial platform controller is not able to perform remaining workflow portions of the plurality of workflow portions, wherein the remaining workflow portions of the plurality of workflow portions does not comprise the first workflow portion;
in response to the determination:
identifying a plurality of additional platform controllers for additional domains that previously expressed capabilities corresponding to the remaining workflow portions of the plurality of workflow portions;
selecting, based on a locality associated with the anchor point, an additional platform controller of the plurality of additional platform controllers; and
initiating performance of the workflow using the initial platform controller and the additional platform controller.

9. The non-transitory computer readable medium of claim 8, wherein the locality specifies a relative association between the additional platform controller and the anchor point.

10. The non-transitory computer readable medium of claim 9, wherein the relative association comprises at least one selected from a group consisting of geographical distance and network distance.

11. The non-transitory computer readable medium of claim 10, wherein the selecting of the additional platform controller comprises making a determination that the additional platform controller has a shorter geographical distance relative to the anchor point than other additional platform controllers of the plurality of additional platform controllers.

12. The non-transitory computer readable medium of claim 10, wherein the selecting of the additional platform controller comprises making a determination that the additional platform controller has a shorter network distance relative to the anchor point than other additional platform controllers of the plurality of additional platform controllers.

13. The non-transitory computer readable medium of claim 8, wherein the anchor point is one selected from a group consisting of a data set and a required capability for a workflow portion of the plurality of workflow portions.

14. The non-transitory computer readable medium of claim 8, wherein the first workflow portion of the plurality of workflow portions comprises the anchor point.

15. A system for deploying workflows, the system comprising:
a federated controller for a device ecosystem, the federated controller comprising a plurality of service controllers;
a service controller of the federated controller, comprising a processor and memory, and configured to:
receive a request to deploy a workflow in the device ecosystem;
decompose the workflow into a plurality of workflow portions;
identify an initial platform controller for a domain associated with an anchor point, wherein the initial platform controller previously expressed capabilities corresponding to a first workflow portion of the plurality of workflow portions;
make a determination that the domain associated with the initial platform controller is not able to perform remaining workflow portions of the plurality of workflow portions, wherein the remaining workflow portions of the plurality of workflow portions does not comprise the first workflow portion;
in response to the determination:
identify a plurality of additional platform controllers for additional domains that previously expressed capabilities corresponding to the remaining workflow portions of the plurality of workflow portions;

select, based on a locality associated with the anchor point, an additional platform controller of the plurality of additional platform controllers; and initiate performance of the workflow using the initial platform controller and the additional platform controller.

16. The system of claim 15, wherein the locality specifies a relative association between the additional platform controller and the anchor point.

17. The system of claim 16, wherein the relative association comprises at least one selected from a group consisting of geographical distance and network distance.

18. The system of claim 17, wherein the selecting of the additional platform controller comprises making a determination that the additional platform controller has a shorter geographical distance relative to the anchor point than other additional platform controllers of the plurality of additional platform controllers.

19. The system of claim 17, wherein the selecting of the additional platform controller comprises making a determination that the additional platform controller has a shorter network distance relative to the anchor point than other additional platform controllers of the plurality of additional platform controllers.

20. The system of claim 15, wherein the anchor point is one selected from a group consisting of a data set and a required capability for a workflow portion of the plurality of workflow portions.

\* \* \* \* \*